US007475677B2

(12) United States Patent
Mori et al.

(10) Patent No.: US 7,475,677 B2
(45) Date of Patent: Jan. 13, 2009

(54) METHOD AND DEVICE FOR CONTROLLING COMBUSTION OF AN INTERNAL-COMBUSTION ENGINE, AND VEHICLE

(75) Inventors: Yoshinobu Mori, Kobe (JP); Takeshi Ikeda, Akashi (JP); Takuya Sakamoto, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 14 days.

(21) Appl. No.: 11/642,996

(22) Filed: Dec. 19, 2006

(65) Prior Publication Data

US 2007/0144494 A1 Jun. 28, 2007

(30) Foreign Application Priority Data

Dec. 20, 2005 (JP) ............................ 2005-366129

(51) Int. Cl.
*F02M 51/00* (2006.01)
*G06F 19/00* (2006.01)

(52) U.S. Cl. ........................ 123/492; 123/493; 701/104

(58) Field of Classification Search ................. 123/492, 123/493, 679, 680, 683, 688, 702, 687; 701/86, 701/104
See application file for complete search history.

(56) References Cited

U.S. PATENT DOCUMENTS

| | | | | |
|---|---|---|---|---|
| 4,782,690 | A * | 11/1988 | Terasaka | 73/116 |
| 5,065,328 | A * | 11/1991 | Abo et al. | 701/93 |
| 5,174,264 | A * | 12/1992 | Matsuoka et al. | 123/488 |
| 5,284,118 | A * | 2/1994 | Kato et al. | 123/478 |
| 5,423,181 | A * | 6/1995 | Katoh et al. | 60/276 |
| 5,575,266 | A * | 11/1996 | Iida | 123/680 |
| 5,797,372 | A * | 8/1998 | Sugimoto | 123/491 |
| 6,065,449 | A * | 5/2000 | Fukuma | 123/436 |
| 6,394,069 | B1 * | 5/2002 | Kondo | 123/339.19 |
| 6,883,493 | B2 * | 4/2005 | Matischok et al. | 123/325 |
| 2005/0258690 | A1 * | 11/2005 | Kusumi | 310/68 D |

FOREIGN PATENT DOCUMENTS

| | | |
|---|---|---|
| JP | 05-240095 | 9/1993 |
| JP | 09-004500 | 7/1997 |

* cited by examiner

*Primary Examiner*—Willis R. Wolfe, Jr.
*Assistant Examiner*—Johnny H. Hoang
(74) *Attorney, Agent, or Firm*—Alleman Hall McCoy Russell & Tuttle LLP

(57) ABSTRACT

A method and apparatus, and vehicle on which the apparatus is mounted, for controlling combustion of a fuel-injection, internal-combustion engine with two or more cylinders are provided. The method includes determining a deceleration condition of a vehicle being driven by the engine, and thinning the fuel-injection of the engine when the deceleration condition is determined.

18 Claims, 22 Drawing Sheets

Normal Injection (cycle 1) → Thinned Injection (1 Injection and 4 Pauses) (cycles 2–5)

| Cycle | 1 | | | | 2 | | | | 3 | | | | 4 | | | | 5 | | | |
|---|---|---|---|---|---|---|---|---|---|---|---|---|---|---|---|---|---|---|---|---|
| #1 Cylinder | INJ | | | | INJ | | | | PSD | | | | PSD | | | | PSD | | | |
| #2 Cylinder | | INJ | | | | INJ | | | | PSD | | | | PSD | | | | PSD | | |
| #4 Cylinder | | | INJ | | | | PSD | | | | INJ | | | | PSD | | | | PSD | |
| #3 Cylinder | | | | INJ | | | | PSD | | | | PSD | | | | INJ | | | | PSD |
| Combustion | YES | YES | YES | YES | YES | YES | NO | NO | NO | NO | YES | NO | NO | NO | NO | YES | NO | NO | NO | NO |

Thinned Injection (1 Injection and 4 Pauses) (cycles 6–10)

| Cycle | 6 | | | | 7 | | | | 8 | | | | 9 | | | | 10 | | | |
|---|---|---|---|---|---|---|---|---|---|---|---|---|---|---|---|---|---|---|---|---|
| #1 Cylinder | INJ | | | | PSD | | | | PSD | | | | PSD | | | | PSD | | | |
| #2 Cylinder | | PSD | | | | INJ | | | | PSD | | | | PSD | | | | PSD | | |
| #4 Cylinder | | | PSD | | | | PSD | | | | INJ | | | | PSD | | | | PSD | |
| #3 Cylinder | | | | PSD | | | | PSD | | | | PSD | | | | INJ | | | | PSD |
| Combustion | YES | NO | NO | NO | NO | YES | NO | NO | NO | NO | YES | NO | NO | NO | NO | YES | NO | NO | NO | NO |

INJ : Injection
PSD : Pause

FIG. 7

INJ : Injection
PSD : Pause

Thinned Injection (1 Injection and 4 Pauses) → Thinned Injection

| Cycle | 1 | | | | 2 | | | | 3 | | | | 4 | | | | 5 | | | |
|---|---|---|---|---|---|---|---|---|---|---|---|---|---|---|---|---|---|---|---|---|
| #1 Cylinder | INJ | | | | PSD | | | | PSD | | | | PSD | | | | PSD | | | |
| #2 Cylinder | | PSD | | | | INJ | | | | PSD | | | | PSD | | | | INJ | | |
| #4 Cylinder | | | PSD | | | | PSD | | | | INJ | | | | INJ | | | | PSD | |
| #3 Cylinder | | | | PSD | | | | PSD | | | | PSD | | | | PSD | | | | PSD |
| Combustion | YES | NO | NO | NO | NO | YES | NO | NO | NO | NO | YES | NO | NO | NO | YES | NO | NO | YES | NO | NO |

Thinned Injection (1 Injection and 2 Pauses)

| | 6 | | | | 7 | | | | 8 | | | | 9 | | | | 10 | | | |
|---|---|---|---|---|---|---|---|---|---|---|---|---|---|---|---|---|---|---|---|---|
| | INJ | | | | PSD | | | | PSD | | | | INJ | | | | PSD | | | |
| | | PSD | | | | PSD | | | | INJ | | | | PSD | | | | PSD | | |
| | | | PSD | | | | INJ | | | | PSD | | | | PSD | | | | INJ | |
| | | | | INJ | | | | PSD | | | | PSD | | | | INJ | | | | PSD |
| | YES | NO | NO | YES | NO | NO | YES | NO | NO | YES | NO | NO | YES | NO | NO | YES | NO | NO | YES | NO |

INJ : Injection

PSD : Pause

FIG. 9

Thinned Injection (1 Injection and 4 Pauses) → Normal Injection

| Cycle | 1 | | | | 2 | | | | 3 | | | | 4 | | | | 5 | | | |
|---|---|---|---|---|---|---|---|---|---|---|---|---|---|---|---|---|---|---|---|---|
| #1 Cylinder | INJ | | | | PSD | | | | PSD | | | | PSD | | | | INJ | | | |
| #2 Cylinder | | PSD | | | | INJ | | | | PSD | | | | PSD | | | | INJ | | |
| #4 Cylinder | | | PSD | | | | PSD | | | | INJ | | | | INJ | | | | INJ | |
| #3 Cylinder | | | | PSD | | | | PSD | | | | PSD | | | | INJ | | | | INJ |
| Combustion | YES | NO | NO | NO | NO | YES | NO | NO | NO | NO | YES | NO | NO | NO | YES | YES | YES | YES | YES | YES |

Immediate Resume (at cycle 4, #4 Cylinder)

Normal Injection

| Cycle | 6 | | | | 7 | | | | 8 | | | | 9 | | | | 10 | | | |
|---|---|---|---|---|---|---|---|---|---|---|---|---|---|---|---|---|---|---|---|---|
| #1 Cylinder | INJ | | | | INJ | | | | INJ | | | | INJ | | | | INJ | | | |
| #2 Cylinder | | INJ | | | | INJ | | | | INJ | | | | INJ | | | | INJ | | |
| #4 Cylinder | | | INJ | | | | INJ | | | | INJ | | | | INJ | | | | INJ | |
| #3 Cylinder | | | | INJ | | | | INJ | | | | INJ | | | | INJ | | | | INJ |
| Combustion | YES | YES | YES | YES | YES | YES | YES | YES | YES | YES | YES | YES | YES | YES | YES | YES | YES | YES | YES | YES |

INJ : Injection

PSD : Pause

FIG. 17

Thinned Injection (1 Injection and 4 Pauses) → Normal Injection

| Cycle | 1 | | | | 2 | | | | 3 | | | | 4 | | | | 5 | | | |
|---|---|---|---|---|---|---|---|---|---|---|---|---|---|---|---|---|---|---|---|---|
| #1 Cylinder | INJ | | | | PSD | | | | PSD | | | | PSD | | | | PSD | | | |
| #2 Cylinder | | PSD | | | | INJ | | | | PSD | | | | PSD | | | | PSD | | |
| #4 Cylinder | | | PSD | | | | PSD | | | | INJ | | | | PSD | | | | PSD | |
| #3 Cylinder | | | | PSD | | | | PSD | | | | PSD | | | | INJ | | | | INJ |
| Combustion | YES | NO | NO | NO | NO | YES | NO | NO | NO | NO | YES | NO | NO | NO | NO | YES | NO | NO | NO | YES |

Normal Resume

Normal Injection

| | 6 | | | | 7 | | | | 8 | | | | 9 | | | | 10 | | | |
|---|---|---|---|---|---|---|---|---|---|---|---|---|---|---|---|---|---|---|---|---|
| | INJ | | | | INJ | | | | INJ | | | | INJ | | | | INJ | | | |
| | | PSD | | | | INJ | | | | INJ | | | | INJ | | | | INJ | | |
| | | | PSD | | | | PSD | | | | INJ | | | | INJ | | | | INJ | |
| | | | | INJ | | | | INJ | | | | INJ | | | | INJ | | | | INJ |
| | YES | NO | NO | YES | YES | YES | NO | YES | YES | YES | YES | YES | YES | YES | YES | YES | YES | YES | YES | YES |

Normal Resume

INJ : Injection

PSD : Pause

FIG. 18

METHOD AND DEVICE FOR CONTROLLING COMBUSTION OF AN INTERNAL-COMBUSTION ENGINE, AND VEHICLE

CROSS-REFERENCE TO RELATED APPLICATION

The present application claims priority from Japanese Patent Application No. 2005-366129 filed Dec. 20, 2005, which is hereby incorporated by reference in its entirety for all purposes.

TECHNICAL FIELD

The present invention relates to a method of controlling combustion of an internal-combustion engine, more particularly, a method and device, and a vehicle on which the device is mounted, for controlling the combustion of the engine, capable of reducing a generation of HC (hydrocarbon) or CO (carbon monoxide) by controlling misfire and excessive fuel supply.

BACKGROUND

For an internal-combustion engine mounted on a vehicle, since a throttle valve arranged to cross an air-intake pipe is configured to be closed typically when slowing down the vehicle, the air-intake pipe is substantially blocked. Then, a space inside the air-intake pipe downstream of the throttle valve drops to a negative pressure because the engine continues running (i.e., also continues emitting exhaust gas). This results in carrying out combustion under a condition in which oxygen runs short, and as a result misfire or excessive fuel supply may occur. Misfire and excessive fuel supply are not desirable because they cause an increase in HC or CO in the exhaust gas; therefore, they cause an increase in temperature of a catalyst to deteriorate the catalyst.

Japanese Unexamined Patent Application Nos. HEI 05-240095 and HEI 09-4500 disclose methods of thinning combustion during a low load operation (especially, during idling).

Japanese Unexamined Patent Application Nos. HEI 05-240095 and HEI 09-4500 describe a control for thinning combustion only when an idling state of the engine is detected; however, no measure to detect vehicle deceleration and base thinning of combustion on a detected vehicle deceleration is described.

Although misfire or excessive fuel supply may occur during deceleration of the vehicle similar to the case of the idling state, when the throttle valve is opened from such a condition and is moved to an acceleration condition, the misfire or excessive fuel supply may be easily repeated since the temperature inside the combustion chamber is dropped because of the previous misfire or excessive fuel supply. In due course, when the temperature inside the combustion chamber increases to a sufficient temperature for combustion, a sudden combustion takes place and, therefore it causes an acceleration shock or a torque variation since a lot of oxygen is supplied into the combustion chamber.

On the other hand, when accelerating from the idling state, the combustion chamber can maintain its temperature high enough for combustion. In addition, a clutch connection exists. Thus, the acceleration shock or torque variation does not cause an adverse effect.

DESCRIPTION OF THE INVENTION

The present invention addresses the above conditions, and provides a method and device, and a vehicle on which the device is mounted, for controlling combustion of the internal-combustion engine, capable of reducing a generation of HC or CO while controlling misfire and excessive fuel supply of the engine during vehicle deceleration.

According to one aspect of the invention, a method of controlling combustion of a fuel-injection, internal-combustion engine with two or more cylinders is provided. The method includes determining a deceleration condition of a vehicle being driven by the engine, and thinning the fuel-injection of the engine when the deceleration condition is determined.

According to another aspect of the invention, an apparatus for controlling combustion of a fuel-injection, internal-combustion engine with two or more cylinders is provided. The apparatus includes deceleration condition determining module for determining a deceleration condition of a vehicle being driven by the engine, and a fuel-injection thinning module for thinning the fuel-injection of the engine when the deceleration condition is determined by the deceleration condition determining module.

According to the aspects, the method or apparatus is capable of improving combustion and fuel consumption of the engine, such as reducing a generation of HC or CO while controlling misfire and excessive fuel supply to the engine during deceleration of the vehicle (that is, the method or apparatus can purify exhaust gas as well). Further, the method or apparatus can reduce heat deterioration of a catalyst that is caused by unburned fuel reaching the catalyst and being burned therein. Further, the method or apparatus can reduce a shock at the time of engine braking by reducing an effect of the engine braking compared with the conventional fuel-cut control. In addition, the method or apparatus can reduce a shock at a restart of fuel-injection after the fuel-injection is thinned, which is caused by an ignition delay when the engine gets cold during the fuel-injection pause and subsequent sudden combustion.

The engine may include an air-intake device, and the apparatus may further include a throttle-close-operation detecting module for detecting a closing operation of a throttle of the air-intake device, and an air-intake-pipe negative-pressure detecting module for detecting an increase in a negative pressure in the air-intake pipe of the air-intake device. The deceleration condition determining module may be configured so that it determines the vehicle being in the deceleration condition, when the throttle-close-operation detecting module detects the throttle-closing operation, and the air-intake-pipe negative-pressure detecting module detects the increase in the negative pressure in the air-intake pipe. The apparatus may determine an increase in the negative pressure in the air-intake pipe during the deceleration condition, and determine with high precision rather than only detecting the throttle-closing operation.

As used herein, the term “negative pressure in the air-intake pipe” represents a pressure of a region of an air-intake passage of the engine, downstream of a throttle valve, and it is usually at a negative pressure with respect to a pressure in upstream of the throttle valve. Therefore, “increase in the negative pressure in the air-intake pipe” means that this negative pressure changes even more to the negative pressure side.

The fuel-injection thinning module may be configured so that where the engine includes an even number of cylinders, it continuously carries out a predetermined number of fuel-injections after continuously pausing the even number of fuel-injections, and where the engine includes an odd number of cylinders, it continuously carries out a predetermined number of fuel-injections after continuously pausing the odd number of fuel-injections. In this case, all of the cylinders are evenly thinned and, thus, a temperature drop of the cylinders may be reduced. The predetermined number may be one.

The number of continuous fuel-injection pauses may be set based on at least any one of an engine speed, a blow-back rate of burned fuel gas, and a negative pressure in an air-intake pipe of the engine. This is because the negative pressure in the air-intake pipe also decreases following a drop of the engine speed which decreases as the vehicle decelerates, and it becomes gradually unnecessary to carry out the thinning operation.

As used herein, the term “blow-back of burned fuel gas” represents a phenomenon in which exhaust gas as a result of complete combustion or unburning (include incomplete combustion, etc.) is discharged from the combustion chamber at an exhaust stroke into the exhaust pipe, and the exhaust gas then moves back from the exhaust pipe into the combustion chamber or into the air-intake pipe during an air-intake stroke. Here, not all the exhaust gas moves back to the combustion chamber or air-intake pipe, but a portion thereof does. This rate of the portion re-introduced is referred to as “a blow-back rate of burned fuel gas.”

The apparatus may further include a fuel-injection-amount adjusting module for adjusting a fuel-injection amount during the thinning of fuel-injection by the fuel-injection thinning module based on at least either one of an engine speed and a negative pressure in an air-intake pipe. Since the cylinder enters an excessive oxygen state after the cylinder is air-scavenged by the thinning operation and oxygen inside the cylinder increases, the fuel-injection amount may be increased.

The apparatus may further include an ignition-timing adjusting module for adjusting an ignition timing during the thinning of fuel-injection by the fuel-injection thinning module based on at least either one of the engine speed and the negative pressure in the air-intake pipe. For example, as the engine speed decreases by the thinning operation, passengers of the vehicle may feel the thinning as a rough impression. In order to reduce this drawback, the ignition timing is retarded to reduce the torque per combustion.

The ignition-timing adjusting module may be configured so that where combustion of the engine is a first combustion after the fuel-injection thinning module starts the thinning of fuel-injection when the fuel-injection amount is not adjusted by the fuel-injection-amount adjusting module, it does not adjust the ignition timing for the combustion. In this case, even if ignition-timing is adjusted after shifting to the thinning operation, the ignition timing may always be used with the fuel-injection amount corresponding to the ignition timing, as a set.

The fuel-injection thinning module may be configured so that it carries out the thinning of fuel-injection when the deceleration condition determining module determines that the engine is in a deceleration condition, and when a water temperature of the engine is not below a predetermined temperature (e.g., approximately 60 degrees C. or higher), and a transmission device is not shifted in the neutral position, a clutch in a driving force transmitting path of the vehicle is not disconnected, an engine speed is not below a predetermined speed (e.g., approximately 500 rpm or higher), and the clutch is not in a state immediately after having been connected (e.g., has been connected for at least a predetermined period of time such as approximately 200 milliseconds or longer). This is because that when further satisfying these conditions during the deceleration condition, the engine is not stable, and there is a high possibility of misfire or excessive fuel supply.

That is, on the other hand, the fuel-injection thinning module may be configured to terminate the thinning of fuel-injection via a predetermined procedure when the deceleration condition determining module does not determine the deceleration condition, or the water temperature of the engine is below the predetermined temperature, the transmission device is shifted in the neutral position, the clutch is disconnected, the engine speed is below the predetermined speed, or the clutch is in a state immediately after having been connected.

The fuel-injection thinning module may be configured to immediately terminate the thinning of fuel-injection without carrying out the predetermined procedure, when a throttle valve of the engine is rapidly-opened, the clutch is in a state immediately after having been connected, or the transmission device is shifted in the neutral position. That is, when the engine torque is suddenly required during the fuel-injection thinning control, the thinning control is terminated as soon as possible, thereby assuring a good acceleration feeling, or preventing the engine stall.

On the other hand, the fuel-injection thinning module may be configured so that where the engine includes an even number of cylinders, it continuously carries out a predetermined number of fuel-injections after continuously pausing the even number of fuel-injections, and where the engine includes an odd number of cylinders, it continuously carries out a predetermined number of fuel-injections after continuously pausing the odd number of fuel-injections. The number of continuously pausing the fuel-injections may be set based on at least any one of the engine speed, and a blow-back rate of burned fuel gas, and a negative pressure in an air-intake pipe of the air-intake device of the engine. The predetermined procedure may include a procedure for completing the number of continuously pausing fuel-injections set by the fuel-injection thinning module before terminating the thinning of fuel-injection when the throttle is not rapidly opened, the clutch is not immediately after it is connected, and the transmission device is not shifted in the neutral position. When it is in such conditions, since it is not necessary to recover the torque immediately, the fuel-injection thinning control is terminated after completing the set number of fuel-injection pauses. Accordingly, the passenger does not feel the torque variations during vehicle deceleration including an acceleration shock (i.e., a transition of the fuel-injection mode).

In addition to the above, the fuel-injection amount during the thinning of fuel-injection by the fuel-injection thinning module may be configured to be adjusted based on at least either one of the engine speed and the negative pressure in the air-intake pipe. The fuel-injection thinning module may be configured so that upon the thinning of fuel-injection is terminated, it continues the adjustment of the fuel-injection amount based on at least either one of the engine speed and the negative pressure in the air-intake pipe, until a first fuel-injection into each of the cylinders after the fuel-injection is restarted. Accordingly, the passenger does not feel the transition of the fuel-injection mode.

Alternatively, the ignition timing during the thinning of fuel-injection by the fuel-injection thinning module may be configured to be adjusted based on at least either one of the engine speed and the negative pressure in the air-intake pipe. The fuel-injection thinning module may be configured so that when the thinning of fuel-injection is terminated, it continues the adjustment of the ignition timing based on at least either one of the engine speed and the negative pressure in the air-intake pipe, until a first fuel-injection into each of the cylinders after the fuel-injection is restarted. Accordingly, the passenger does not feel the torque variations during the deceleration condition including the acceleration shock (i.e., the transition of the fuel-injection mode).

The above combustion controlling apparatus is suitable for various kinds of vehicles that include an internal-combustion engine as its drive source.

BRIEF DESCRIPTION OF THE DRAWINGS

The disclosure is illustrated by way of example and not by way of limitation in the figures of the accompanying drawings, in which the like reference numerals indicate similar elements and in which:

FIG. 7 is a chart showing an example of a fuel-injection interval setting at the start of the fuel-injection thinning control, stored in a fuel-injection interval setting storage area of the combustion controlling apparatus shown in FIG. 2.

FIG. 9 is a chart showing still another example of the fuel-injection interval setting at the start of the fuel-injection thinning control, stored in the fuel-injection interval setting storage area of the combustion controlling apparatus shown in FIG. 2.

FIG. 17 is a chart showing an example (immediate resume) of the fuel-injection interval setting at the termination of the fuel-injection thinning control stored in the fuel-injection interval setting storage area of the combustion controlling apparatus shown in FIG. 2.

FIG. 18 is a chart showing another example (normal resume) of fuel-injection interval setting at the termination of the fuel-injection thinning control, stored in the fuel-injection interval setting storage area of the combustion controlling apparatus shown in FIG. 2.

DETAILED DESCRIPTION

Hereafter, a method and device, and a vehicle on which the device is mounted, for controlling combustion of an internal-combustion engine according to the present invention will be explained in detail referring to the attached drawings.

Figure 1:
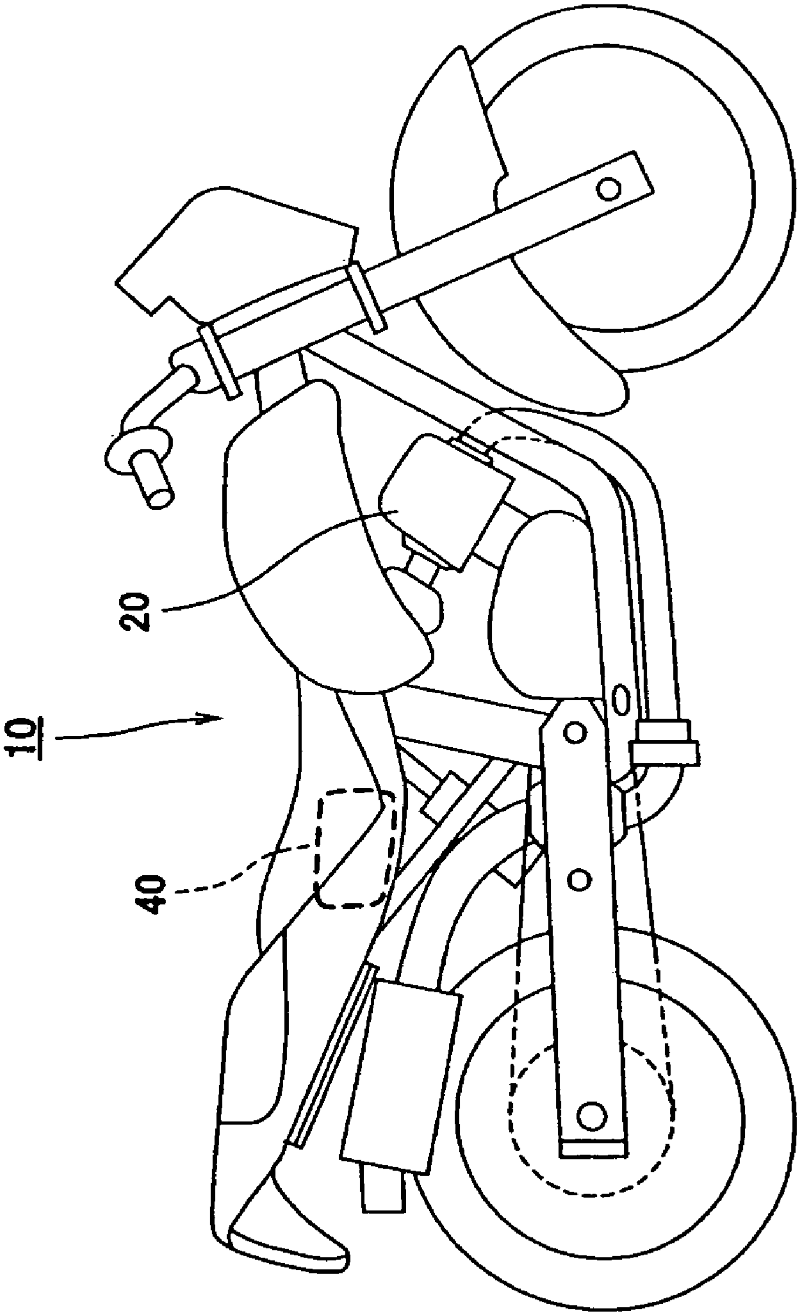
FIG. 1 is a right side view showing a configuration of a vehicle according to an embodiment of the invention.

Although a vehicle 10 according to an embodiment of the present invention shown in FIG. 1 is a typical motorcycle, the vehicle 10 may be any other type of vehicle. The vehicle 10 in the form of the motorcycle typically includes an ECU (Electronic Control Unit) 40 that carries out electronic control of a four-cycle engine 20 as the internal-combustion engine.

Figure 2:
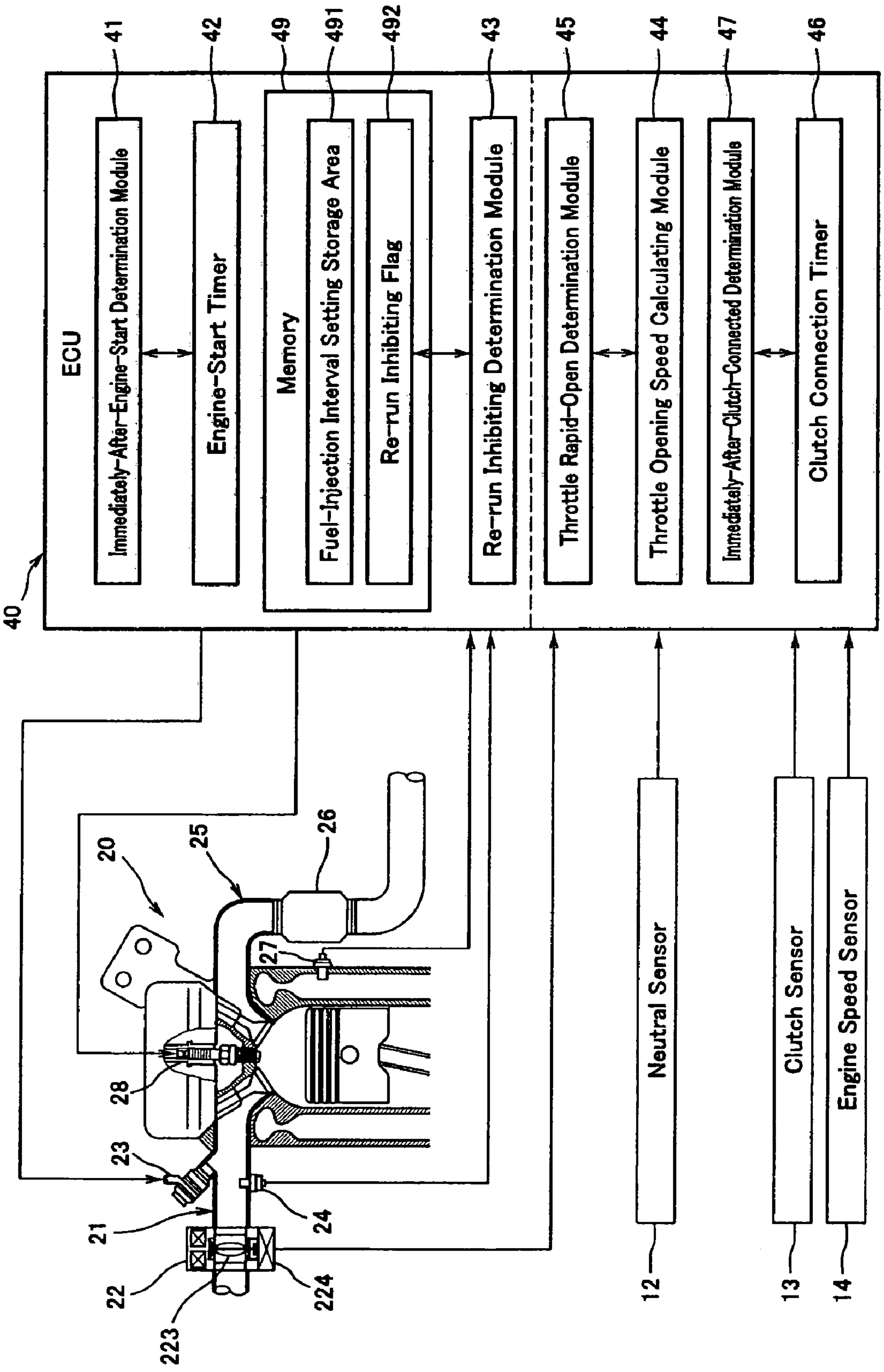
FIG. 2 is a block diagram showing an example of a configuration of a combustion controlling apparatus of an internal-combustion engine mounted on the vehicle shown in FIG. 1.

As shown in FIG. 2, the engine 20 includes a throttle body 22 in an air-intake passage 21, and a fuel injector 23 provided downstream of the throttle body 22 in the air-intake passage 21, while it includes a catalyst 26 in an exhaust passage 25.

The throttle body 22 is a typical throttle body, and includes a throttle valve 223 provided so as to cross the air-intake passage 21 that passes through inside the throttle body 22, and a throttle opening sensor 224 for detecting an opening of the throttle valve 223. The throttle opening detected by the throttle opening sensor 224 is transmitted to the ECU 40 that is connected with the throttle opening sensor 224.

An air-intake pressure sensor 24 is provided downstream of the throttle body 22 in the air-intake passage 21, for detecting a pressure of this section in the air-intake passage 21.

Moreover, cylinders of the engine 20 are provided with a water temperature sensor 27 for detecting a temperature of engine coolant that flows through a water jacket inside a wall of the cylinders. The water temperature detected by the water temperature sensor 27 is transmitted to the ECU 40 that is connected with the water temperature sensor 27.

The ECU 40 is connected with the throttle opening sensor 224, the air-intake pressure sensor 24, and the water temperature sensor 27, as described above, and acquires information detected by these sensors. The ECU 40 is also connected with a neutral sensor 12, a clutch sensor 13, and an engine speed sensor 14.

The neutral sensor 12 detects whether a transmission device or gears (not shown) of the vehicle 10 (refer to FIG. 1) is shifted in a neutral position. The clutch sensor 13 detects connection/disconnection of a clutch (not shown) that connects/disconnects a driving-force transmitting path of the vehicle 10 (refer to FIG. 1). The engine speed sensor 14 detects an engine speed of the engine 20. Each of these sensors transmits the detected information to the ECU 40, respectively.

The ECU 40 refers to information (a fuel-injection interval setting, etc.) stored in a fuel-injection interval setting storage area 491 (described later) based on the information from these sensors. The ECU 40 controls a fuel-injection and ignition by transmitting an instruction to a fuel injector 23 and a spark plug 28 of the engine 20, respectively. In this embodiment, the ECU 40 is mainly configured to control the fuel-injection, as described hereinafter.

The ECU 40 includes a memory 49, as well as an immediately-after-engine-start determination module 41, an engine-start timer 42, and a re-run inhibiting determination module 43. The memory 49 is provided with a storage area for a re-run inhibiting flag 492 and the fuel-injection interval setting storage area 491 described above. In this embodiment, the ECU 40 detects a deceleration condition of the vehicle 10 (refer to FIG. 1), and when the deceleration condition is detected, the ECU 40 carries out a thinning control of fuel-injection of the engine 20 according to the setting information stored in the fuel-injection interval setting storage area 491. As used herein the term "thinning" of fuel injection refers to inhibiting fuel delivery to one or more cylinders. Hereafter, this fuel-injection thinning control will be explained in more detail.

Figure 3:
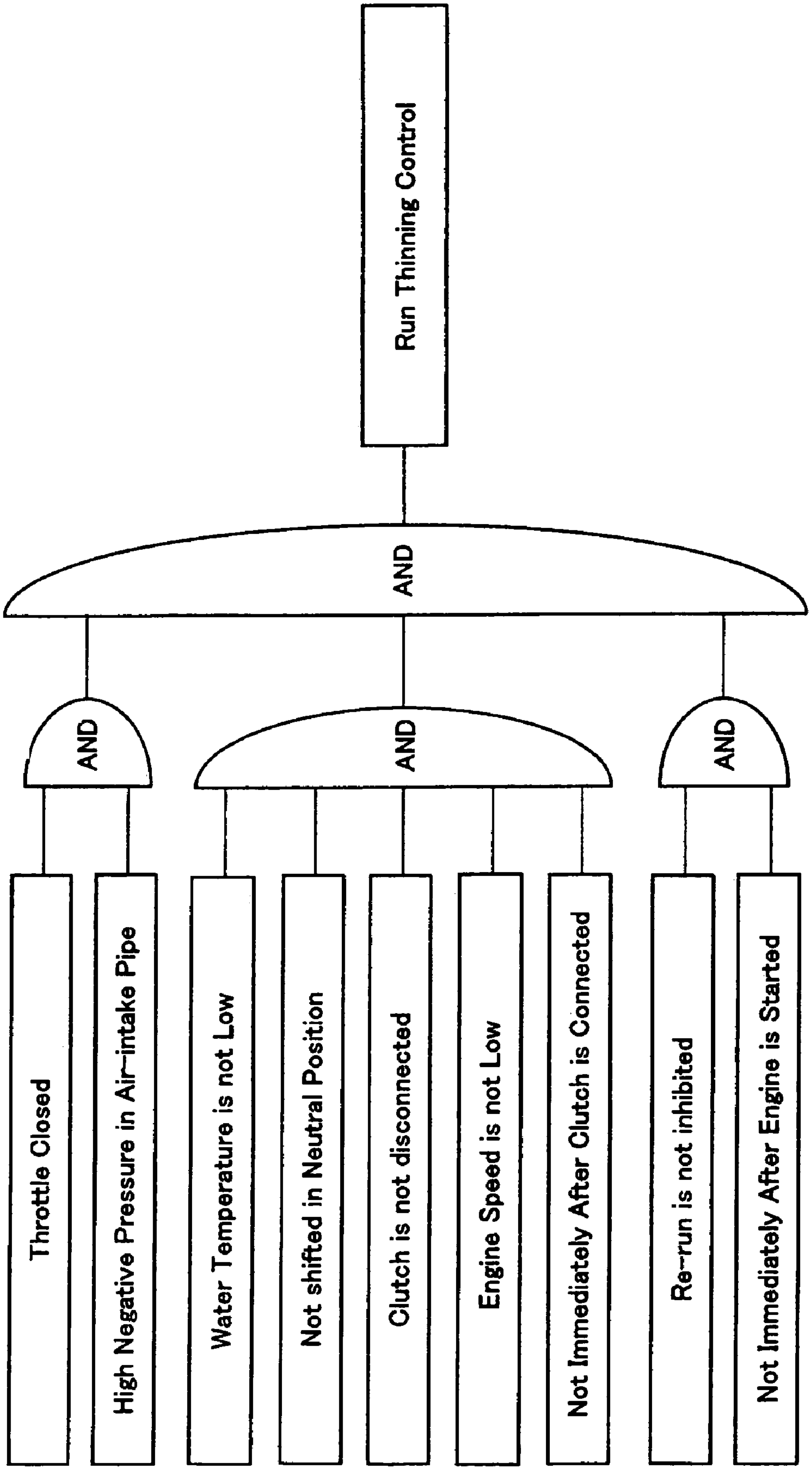
FIG. 3 is a chart showing a fuel-injection thinning control start logic by the combustion controlling apparatus shown in FIG. 2.

As shown in FIG. 3, in this embodiment, the ECU 40 is configured so that it determines the vehicle 10 (refer to FIG. 1) is in the deceleration condition when a driver operates the throttle valve 223 to a mostly closed state (that is, herein referred to as a "throttle-closing operation") using a throttle control (not illustrated), when the air-intake pressure sensor 24 disposed downstream of the throttle valve 223 in the air-intake passage detects a high negative pressure state inside the air-intake passage 21, for example, a pressure higher than approximately 300 mmHg (that is, "a high negative pressure in the air-intake pipe").

Alternatively, even if the ECU 40 determines the deceleration condition of the vehicle 10 (refer to FIG. 1), it may be configured so that it does not carry out the fuel-injection thinning control until all of the following conditions are satisfied: as further shown in FIG. 3, the water temperature of the engine 20 is not low (for example, approximately 60 degrees C. or higher); the gears (not shown) are not shifted in the neutral position; the clutch is not disconnected; the engine speed is not low (for example, approximately 1500 rpm or higher); the clutch is in a state not immediately after having been connected, that is, has been connected for a predetermined period of time (for example, after approximately 200 milliseconds or more from connecting the clutch); the fuel-injection thinning control is not in the re-run status (described later); and the engine is not immediately after its start (for example, approximately 12 seconds or more from the engine start). This is because, if all of these seven conditions are not satisfied, an operational state of the engine 20 is unstable. Thus, if the fuel-injection thinning control is started in the operational state, there is a possibility of a stall of the engine 20.

The ECU 40 may determine that the water temperature of the engine 20 is not low based on the information from the water temperature sensor 27, that the transmission device is not shifted in the neutral position based on the information from the neutral sensor 12, that the clutch is not disconnected based on the information from the clutch sensor 13, and that the engine speed is not low based on the information from the engine speed sensor 14, for example.

Further, it may be determined that the clutch is in a state not immediately after having been connected (i.e., has been connected for a predetermined period of time) by providing a clutch connection timer 46 (refer to FIG. 2) to the ECU 40. The clutch connection timer 46 measures a time from the clutch being connected based on the information from the clutch sensor 13. This determination is made by the ECU 40 so that the immediately-after-clutch-connected determination module 47 (refer to FIG. 2) refers to the clutch connection timer 46, and determines whether the measured time is less than a predetermined time (for example, less than approximately 200 milliseconds).

That the fuel-injection thinning control is not in the re-run status may be determined by providing a storage area for the re-run inhibiting flag 492 (refer to FIG. 2) in the memory 49. The re-run inhibiting flag 492 stays ON in the storage area for a predetermined period of time (for example, approximately 200 milliseconds) after the last fuel-injection thinning control is terminated. This flag is put down after the lapse of the predetermined time. This determination is made by the ECU 40 so that the re-run inhibiting determination module 43 (refer to FIG. 2) refers the re-run inhibiting flag 492, and determines that it is not in the re-run status when the flag is OFF.

Permitting re-running the control immediately after the termination of the injection thinning causes an alternation of ON and OFF of the control, unintentional instability of the operational state of the engine, or a possibility of a passenger feeling the torque variation.

That the engine 20 is not in a state immediately after engine start may be determined by providing an engine-start timer 42 (refer to FIG. 2) to the ECU 40. The engine-start timer 42 measures a time from the start of the engine 20. This determination is made by the ECU 40 so that the immediately-after-engine-start determination module 41 (refer to FIG. 2) refers to the engine-start timer 42, and determines whether the measured time that the engine has been operating is less than a predetermined time (for example, less than approximately 12 seconds).

Figure 4:
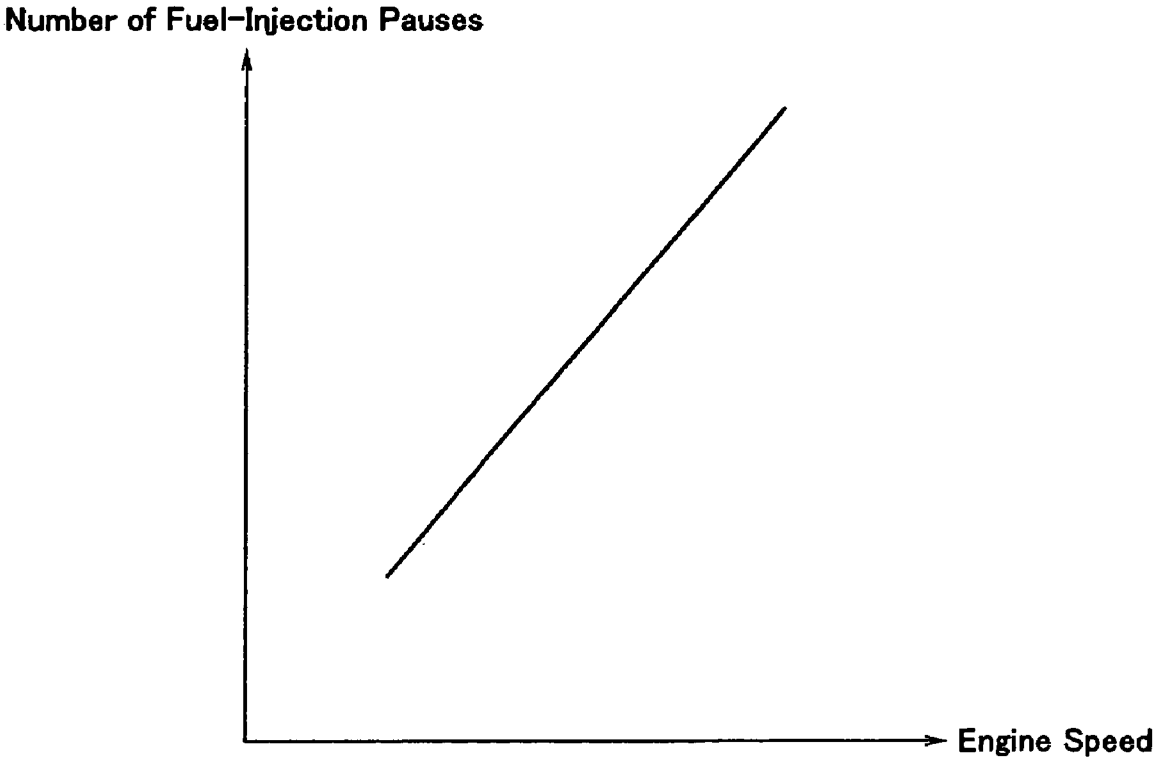
FIG. 4 is a graph showing an example of the number of pauses of a fuel-injection per one fuel-injection cycle corresponding to an engine speed by the combustion controlling apparatus shown in FIG. 2.
Figure 5:
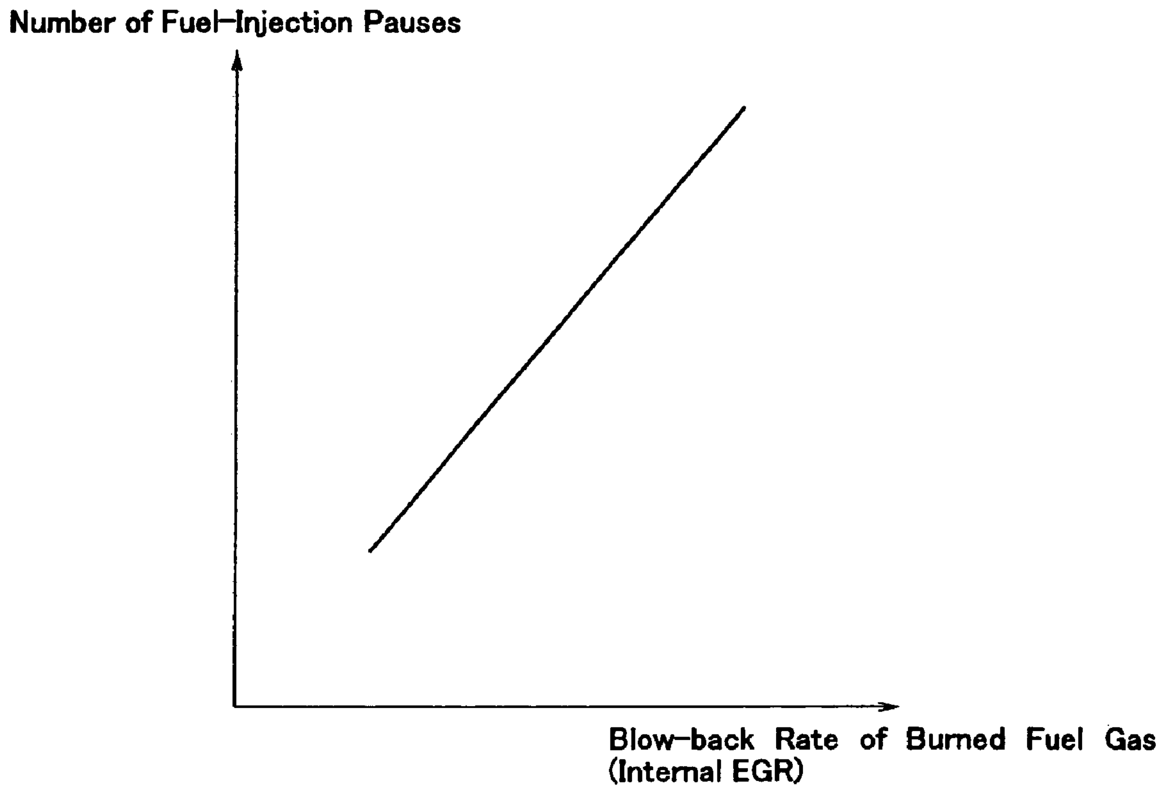
FIG. 5 is a graph showing an example of the number of pauses of the fuel-injection per one fuel-injection cycle corresponding to a blow-back rate of burned fuel gas (internal Exhaust Gas Return or EGR) by the combustion controlling apparatus shown in FIG. 2.
Figure 6:
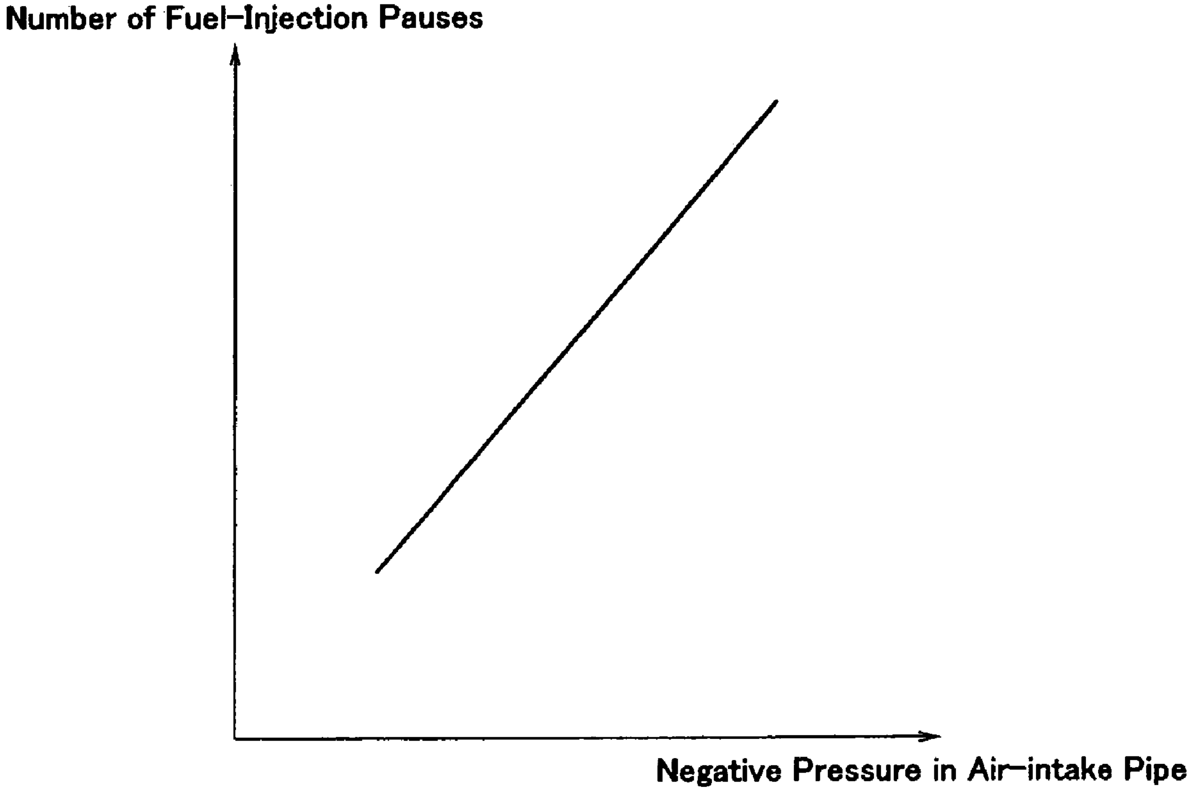
FIG. 6 is a graph showing an example of the number of pauses of the fuel-injection per one fuel-injection cycle corresponding to a negative pressure in an air-intake pipe by the combustion controlling apparatus shown in FIG. 2.

Thus, in this embodiment, the ECU 40 is configured to carry out the fuel-injection thinning control when all of the nine conditions shown in FIG. 3 are satisfied. In other words, in principle in this embodiment, the fuel-injection thinning control is terminated if any one of the conditions is not satisfied. The number of thinning, that is, the number of continuous fuel-injection pauses for the entire engine 20, or "the number of fuel-injection pauses", as shown in FIGS. 4-6, is configured to be approximately proportional to the engine speed, the blow-back rate of burned fuel gas (internal EGR) or the negative pressure in the air-intake pipe. Such proportionality may be stored in the fuel-injection interval setting storage area 491 of the memory 49, and may be configured to be available for the ECU 40, for example. However, "the number of fuel-injection pauses" is not limited to such a proportional relationship.

Moreover, although the fuel-injection thinning control in this embodiment has been configured so that only the fuel-injection by the fuel injector 23 is thinned, the ignition by the spark plug 28 may also be thinned in addition to this fuel-injection.

Figure 8:
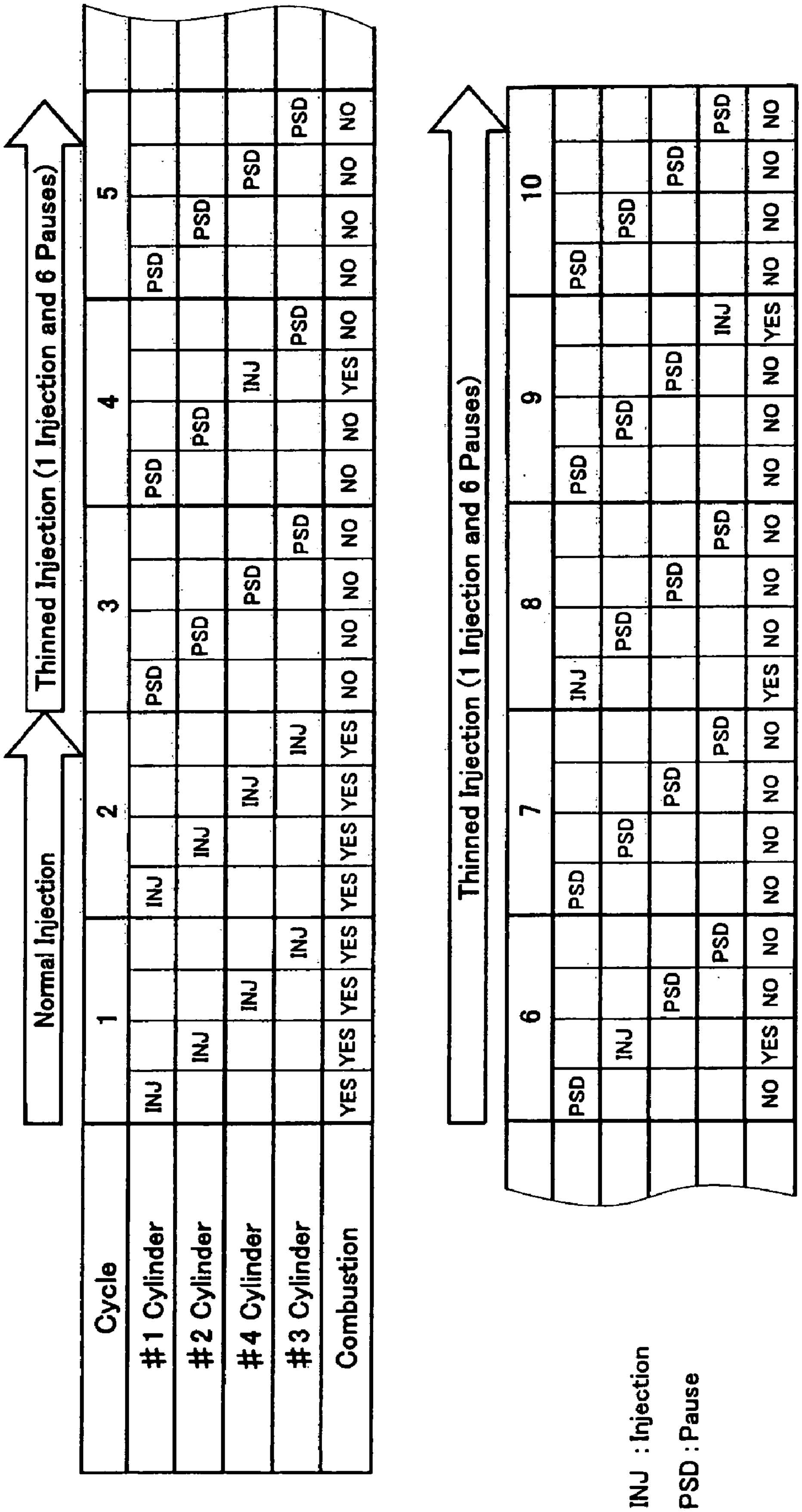
FIG. 8 is a chart showing another example of the fuel-injection interval setting at the start of the fuel-injection thinning control, stored in the fuel-injection interval setting storage area of the combustion controlling apparatus shown in FIG. 2.

One example of the setting information stored in the fuel-injection interval setting storage area 491 may be in the form of a map, as shown in FIGS. 7 and 8. This map shows an example for the four-cylinder engine 20, and similar principles may be applicable to other numbers of cylinders. In this embodiment, it is configured so that the ignition is always carried out in each of the cylinders and, here, only the fuel-injection is controlled to be thinned. As it will be described later, although the ignition timing is controlled auxiliary in this embodiment, "thinning" of the ignition is not carried out. Therefore, in this embodiment, it can be determined whether or not combustion is carried out based on the existence of the fuel-injection. In FIGS. 7 and 8, that combustion is carried out is indicated by "Y", and that combustion is not carried out is indicated by "N", respectively.

Preferably, the number of fuel-injection pauses is an even number when the engine 20 has an even number of cylinders. For example, when the engine 20 has four cylinders, as shown in FIG. 7, the fuel-injection may be carried out once after pausing the fuel-injection four times (i.e., one injection and four pauses), or as shown in FIG. 8, the fuel-injection may be carried out once after pausing the fuel-injection six times (i.e., one injection and six pauses).

In FIG. 7, an example in which the normal fuel-injection is carried out up to the middle of the second cycle is shown. Up to this point, the fuel-injection is carried out one by one from the first (#1), second (#2), fourth (#4), and third (#3) cylinders, and combustion takes place in all of the cylinders. In the second cycle, after carrying out the fuel-injection into the first cylinder and the second cylinder, it shifts to the thinned fuel-injection of one injection and four pauses. Fuel-injection is paused in the fourth, third, first, and second cylinders for a total of four times and, then, fuel-injection is carried out once in the fourth cylinder and, then, pausing of fuel-injection is repeated in the third, first, second, and fourth cylinders for a total of four times.

In FIG. 8, another example in which the normal fuel-injection is carried out up to the second cycle is shown. Up to this point, fuel-injection is carried out one by one from the first (#1), second (#2), fourth (#4), and third (#3) cylinders, and combustion takes place in all of the cylinders. From the third cycle, it shifts to the thinned fuel-injection of one injection and six pauses, and fuel-injection is paused in the first, second, fourth, third, first, and second cylinders for the total of six times and, then, fuel-injection is carried out once in the fourth cylinder and, then, pausing of fuel-injection is repeated in the third, first, second, fourth, third, and first cylinders for the total of six times.

As also seen from FIGS. 7 and 8, because of the setting of the number of fuel-injection pauses as described above where fuel-injection is paused an even number of times for the engine 20 with the even number of cylinders, it is possible to avoid combustion in a specific cylinder from continuously being paused and, thus, reduce a temperature drop of the specific cylinder. The temperature drop of the cylinder causes difficulty in combustion after pause(s), thereby causing misfire or excessive fuel supply.

As described above, the number of fuel-injection pauses may be fixed to a number corresponding to the engine speed, the blow-back rate of burned fuel gas (internal EGR), or the negative pressure in the air-intake pipe at the start of the fuel-injection thinning control. Alternatively, as shown in FIG. 9, the number may be reduced in steps or gradually reduced, following the relationship as shown in FIGS. 4-6, according to the engine speed, the blow-back rate of burned fuel gas (internal EGR), or the negative pressure in the air-intake pipe which decrease as the vehicle decelerates. Shown in FIG. 9 is an example in which thinning of fuel-injection of one injection and four pauses is carried out up to the middle of the fourth cycle, and, then, it shifts to thinning of fuel-injection of one injection and two pauses.

As the fuel-injection thinning control is started, the cylinders (i.e., combustion chambers) are air-scavenged, and, thus, an amount of oxygen in each of the cylinders increases. For this reason, in order to prevent excessive oxygen on the contrary, it is desirable to correct an amount of fuel-injection so that it increases from usual, as follows.

Figure 10:
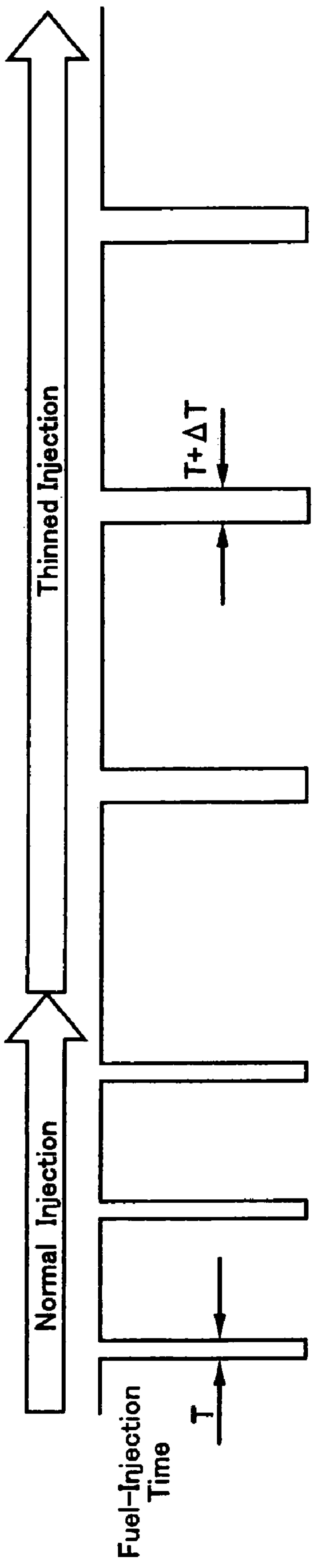
FIG. 10 is a chart showing a fuel-injection time at the start of the fuel-injection thinning control by the combustion controlling apparatus shown in FIG. 2, as an injector voltage command value.
Figure 11:
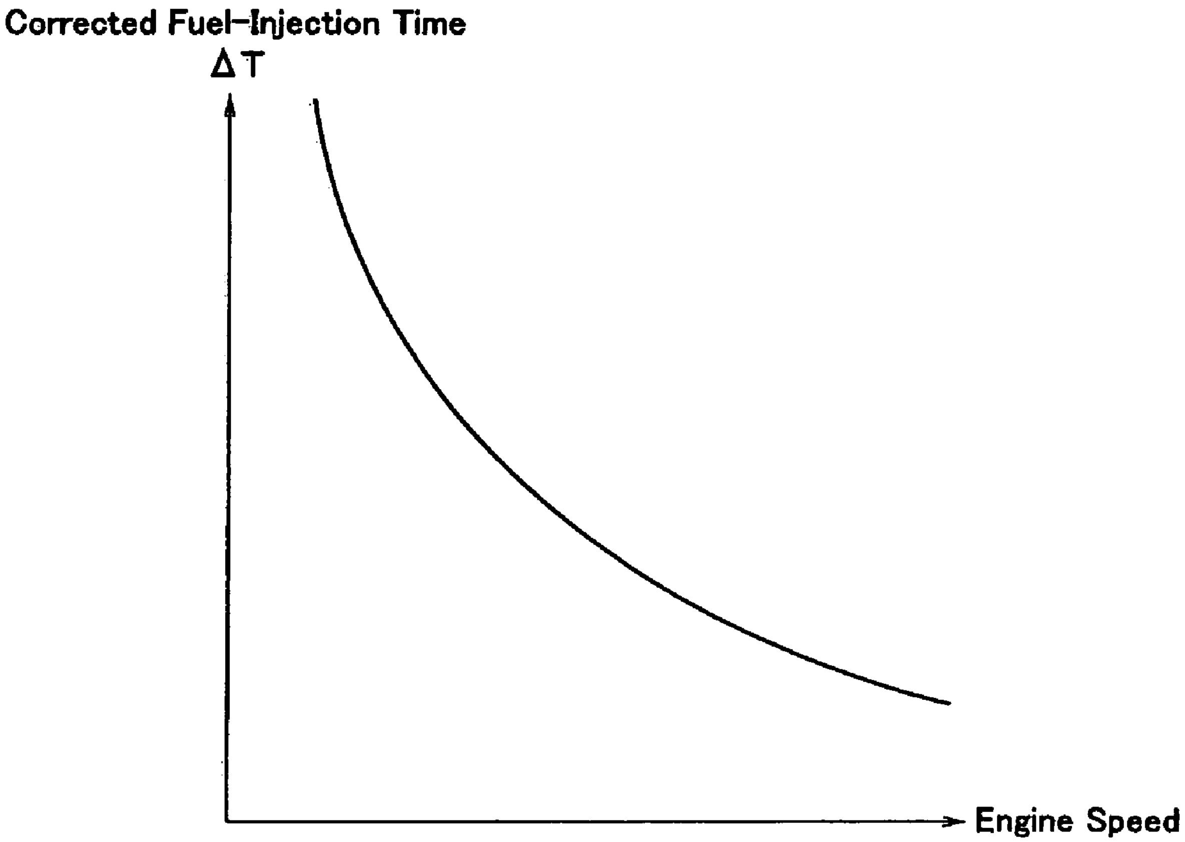
FIG. 11 shows a graph showing an example of corrected fuel-injection time (ΔT) corresponding to the engine speed by the combustion controlling apparatus shown in FIG. 2.
Figure 12:
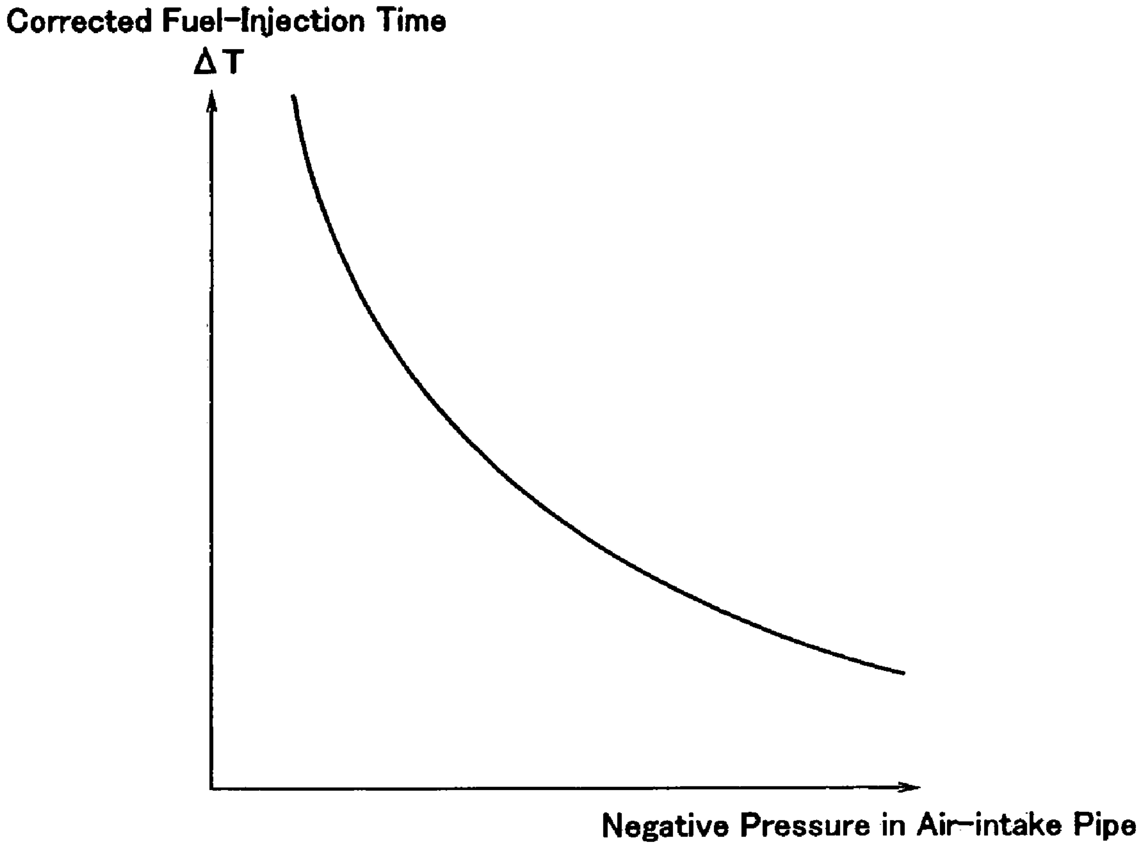
FIG. 12 shows a graph showing an example of the corrected fuel-injection time (ΔT) corresponding to the negative pressure in the air-intake pipe by the combustion controlling apparatus shown in FIG. 2.

That is, as shown in FIG. 10, if an injection command value (i.e., a fuel-injection time) to the fuel injector 23 during the normal fuel-injection is set as a time T, an injection instruction value during the thinned fuel-injection is set as a time $T+\Delta T$. It is desirable that a corrected amount of the injection command value during the normal fuel-injection (i.e., a corrected fuel-injection time) $\Delta T$ is, as shown in FIGS. 11 or 12, approximately inversely proportional to the engine speed or the negative pressure in the air-intake pipe. This is because the air-scavenging tends to be stimulated to increase the excessive oxygen when the engine speed or the negative pressure in the air-intake pipe is lower. Therefore, in FIG. 10, although the $\Delta T$ has been indicated as being fixed during the thinned fuel-injection, it is also possible to increase in steps or gradually increase following the decrease in the engine speed or the negative pressure in the air-intake pipe.

For example, the corrected fuel-injection time $\Delta T$ may be set as approximately +300 microseconds when the engine speed is at approximately 8000 rpm, or as approximately +1000 microseconds when the engine speed is at approximately 3000 rpm, and so forth.

When the thinned fuel-injection is carried out and the engine speed or the negative pressure in the air-intake pipe decreases, a torque by which the engine 20 generates per combustion may be large even if the fuel-injection amount is corrected as described above, and, thus, the passenger may be able to physically recognize the thinning. This may be what is called a "rough" feeling.

Figure 13:
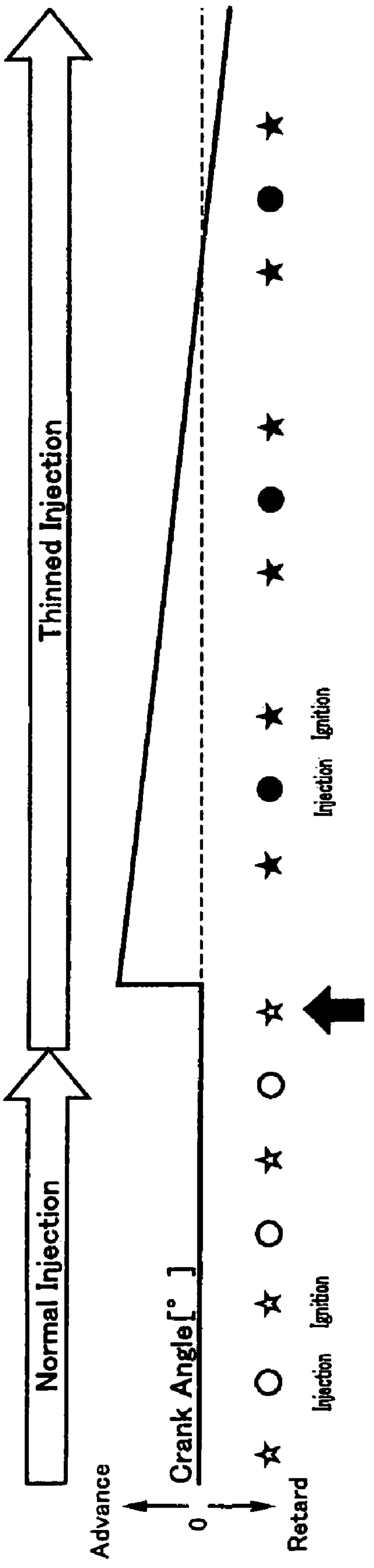
FIG. 13 is a chart showing an example of an ignition timing at the start of the fuel-injection thinning control by the combustion controlling apparatus shown in FIG. 2, as a crank angle.

In order to reduce this, it is desirable to correct the ignition timing during the thinned fuel-injection as follows. In FIG. 13, white arrows in the transverse direction indicate the normal fuel-injection period and the thinned fuel-injection period. Here, "a white circle" indicates fuel-injection during the normal fuel-injection, "a white star" indicates ignition during the normal fuel-injection, "a black circle" indicates fuel-injection during the thinned fuel-injection, and "a black star" indicates ignition during the thinned fuel-injection, respectively. Here, in order to simplify the illustration, an example of the thinned fuel-injection with one injection and one pause is shown in this figure.

Figure 14:
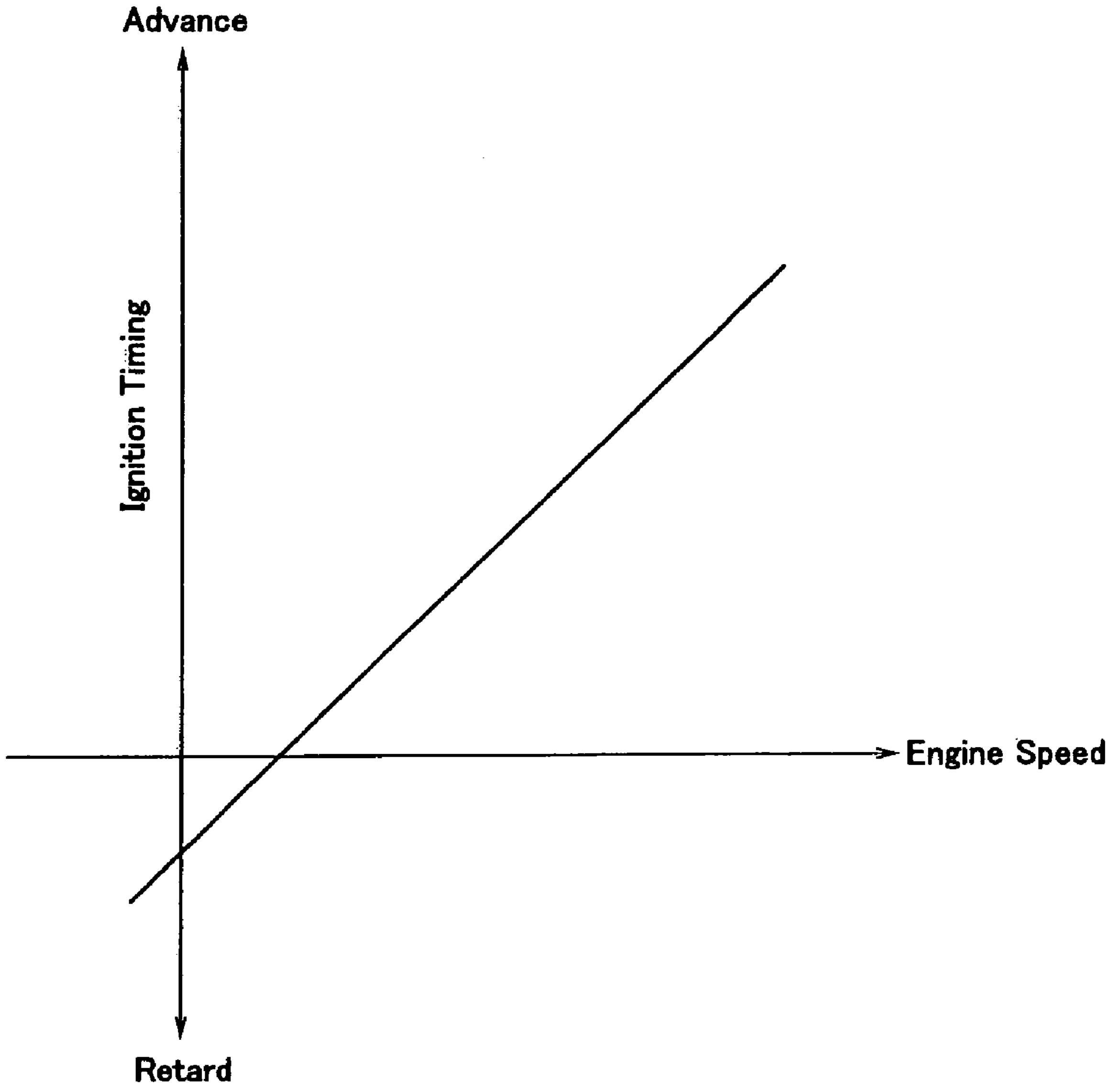
FIG. 14 is a graph showing an example of the ignition timing (crank angle) corresponding to the engine speed by the combustion controlling apparatus shown in FIG. 2.
Figure 15:
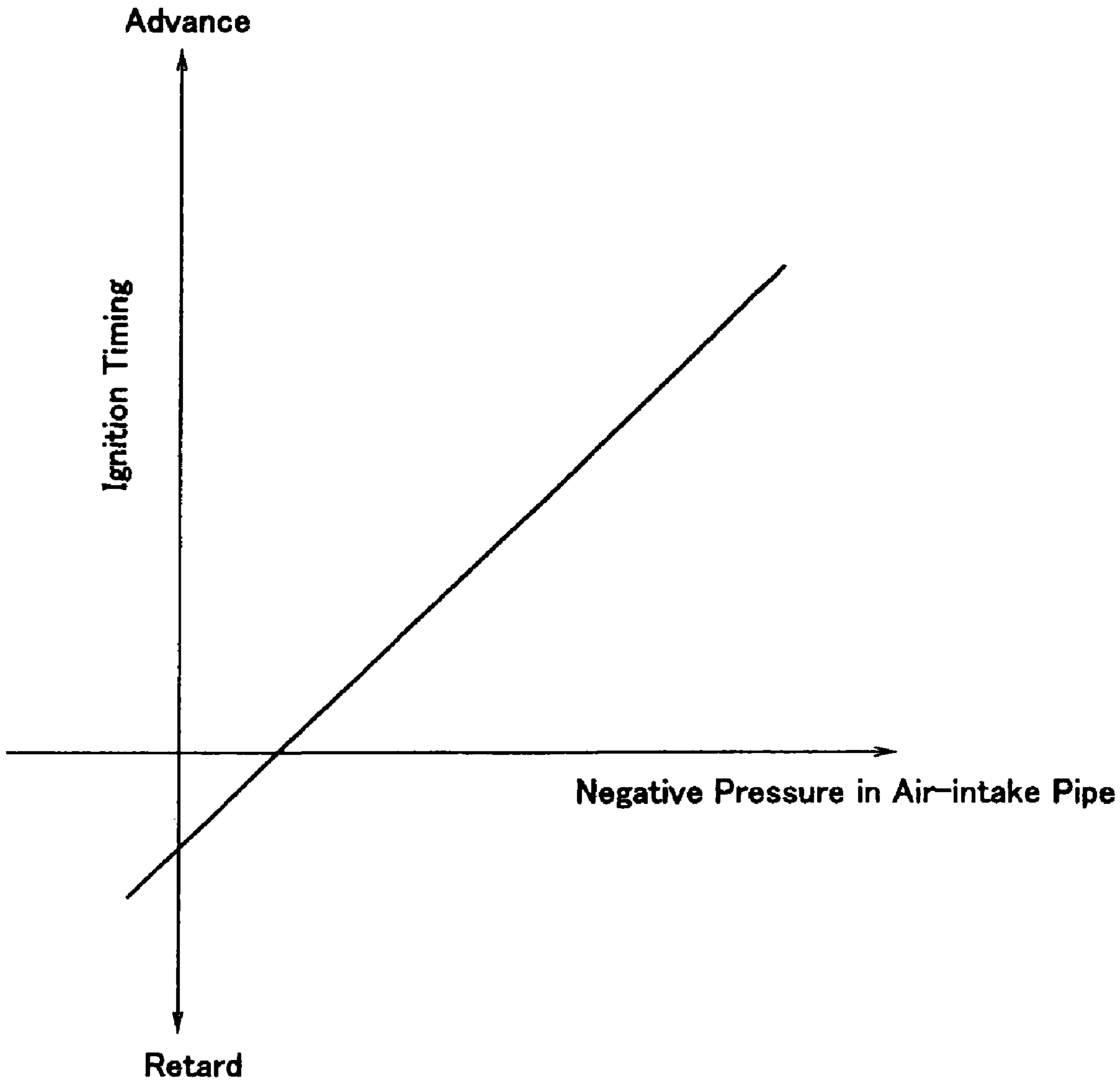
FIG. 15 is a graph showing an example of the ignition timing (crank angle) corresponding to the negative pressure in the air-intake pipe by the combustion controlling apparatus shown in FIG. 2.

It is desirable that the ignition timing is approximately proportional to the engine speed or the negative pressure in the air-intake pipe, as shown in FIG. 13 or 14. For example, the ignition timing is approximately +10 degrees CA (crank angle) when the engine speed is approximately at 8000 rpm, and is approximately −5 degrees CA when the engine speed is approximately at 2000 rpm.

Therefore, returning to FIG. 13, the ignition timing is once advanced by a predetermined amount (same level as the above) because the torque of the engine 20 is hard to increase due to the thinned fuel-injection at the start of the thinning, and, then, the ignition timing is gradually retarded in order to suppress the torque corresponding to the engine speed that decreases as the vehicle slows down. However, depending on an operational state of the vehicle, such advancing of the ignition timing may not be necessary, or alternatively, the ignition timing may be gradually retarded.

In FIG. 13, ignition at the time indicated by a black arrow is carried out with an ignition timing that is as the same as that of the normal fuel-injection although it has already been shifted into the thinned fuel-injection. This shows that ignition is carried out with the normal ignition timing even if it is shifted to the thinned fuel-injection when an amount of unburned fuel that is injected is the amount for the normal fuel-injection.

Figure 16:
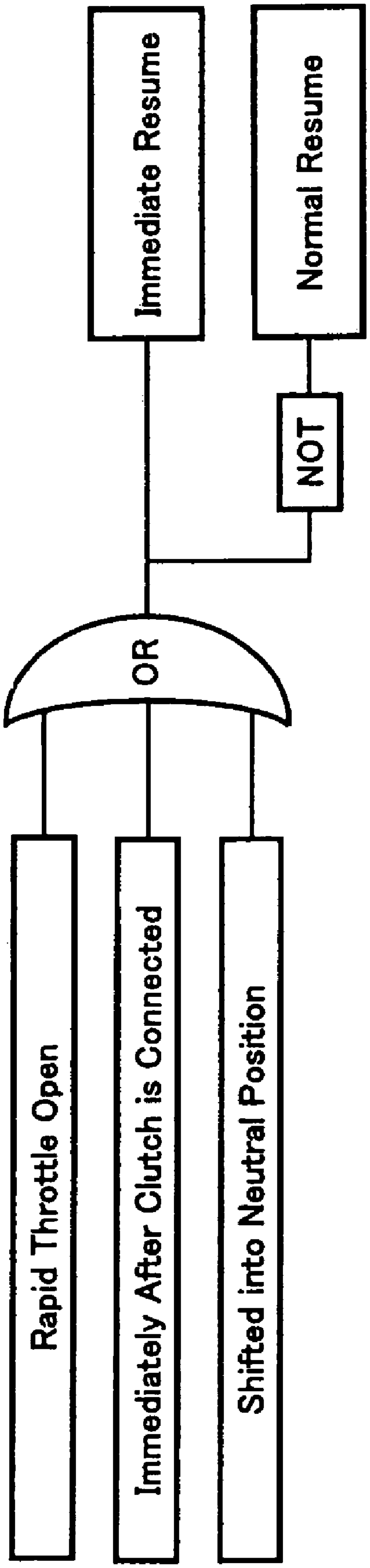
FIG. 16 is a chart showing a terminating logic of the fuel-injection thinning control by the combustion controlling apparatus shown in FIG. 2.

Next, referring to FIG. 16, a resume operation from the fuel-injection thinning control to the normal fuel-injection control will be explained. Fundamentally in this embodiment, the resume operation is carried out when any one of the conditions shown in FIG. 3 is not satisfied. However, in a specific condition such as a gear shift, etc., it is resumed to the normal fuel-injection control immediately (Immediate Resume) since a large engine torque is needed. Other than that, since it may be felt by the passenger as an acceleration shock or a torque variation if it is immediately resumed to the normal fuel-injection control, the number of fuel-injection pauses is gradually reduced, finally to zero (Normal Resume).

Specifically, the ECU 40 is configured so that it carries out the immediate resume when the throttle valve 223 is rapidly opened (that is, Rapid Throttle Open) by the driver operating the throttle control (not illustrated) at a gear shift, or when the clutch is in a state immediately after having been connected (i.e., Immediately After Clutch is Connected), or when the transmission device is shifted into the neutral position (i.e., Shifted into Neutral Position), or otherwise, it carries out the normal resume.

The rapid throttle open may be determined by the throttle valve 223 being opened faster than a predetermined opening rate (e.g., approximately +160 degrees per second or faster), for example. Specifically, as shown in FIG. 2, the throttle opening speed calculating module 44 calculates an opening rate based on the throttle opening transmitted from the throttle opening sensor 224. By determining whether the opening rate exceeds the predetermined rate by the throttle rapidly-open determination module 45, the ECU 40 determines the rapid throttle open.

It may be determined that the clutch is in the state immediately after having been connected by determining that the clutch has been connected for less than a predetermined period of time, for example, a time being less than approximately 200 milliseconds. Specifically, as shown in FIG. 2, the clutch connection timer 46 starts a time count upon the information indicating the clutch connection transmitted from the clutch sensor 13. This determination is made by the ECU 40 so that the immediately-after-clutch-connected determination module 47 determines whether the time count does not exceed the predetermined time period.

FIG. 17 shows an example of the immediate resume. In FIG. 17, the thinned fuel-injection (one injection and four pauses) is carried out up to the middle of the fourth cycle. Originally, if the thinned fuel-injection is continued after the pause of the second cylinder in the fourth cycle (at the time of a black arrow shown in FIG. 17), the following fourth cylinder is paused. However in this immediate resume, the fourth cylinder is not paused, and pauses of all of the cylinders are terminated immediately to resume the normal fuel-injection.

FIG. 18 shows an example of the normal resume. In FIG. 18, the thinned fuel-injection (one injection and four pauses) is carried out up to the middle of the fourth cycle. After the pause of the second cylinder in this fourth cycle (at the time of a black arrow shown in FIG. 18), it does not resume immediately, but after completing four fuel-injection pauses (one pause for each of the cylinders), each of the cylinders is resumed one by one, and finally, it is resumed to the normal fuel-injection. If this transition is seen by the existence of fuel-injection in all of the cylinders, the number of fuel-injection pauses (i.e., a fuel-injection thinning frequency) decreases gradually, and, thus, it makes it difficult to feel the torque variation upon the change in the fuel-injection mode.

How many times fuel-injection is paused in each of the cylinders is stored each time in the memory 49, and the ECU 40 determines whether the fuel-injection pauses are completed by comparing the number of pauses stored in the memory 49 and the number of pauses to be carried out in the thinned fuel-injection.

Figure 19:
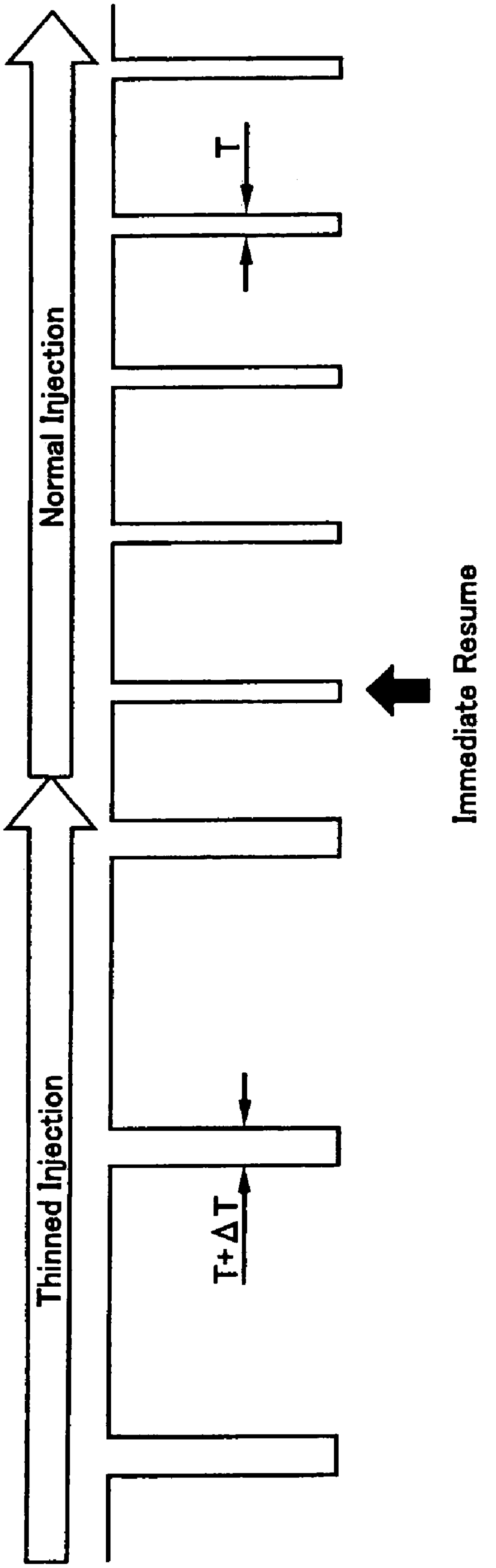
FIG. 19 is a chart showing the fuel-injection time at the time of the immediate resume shown in FIG. 17, as an injector voltage command value.
Figure 20:
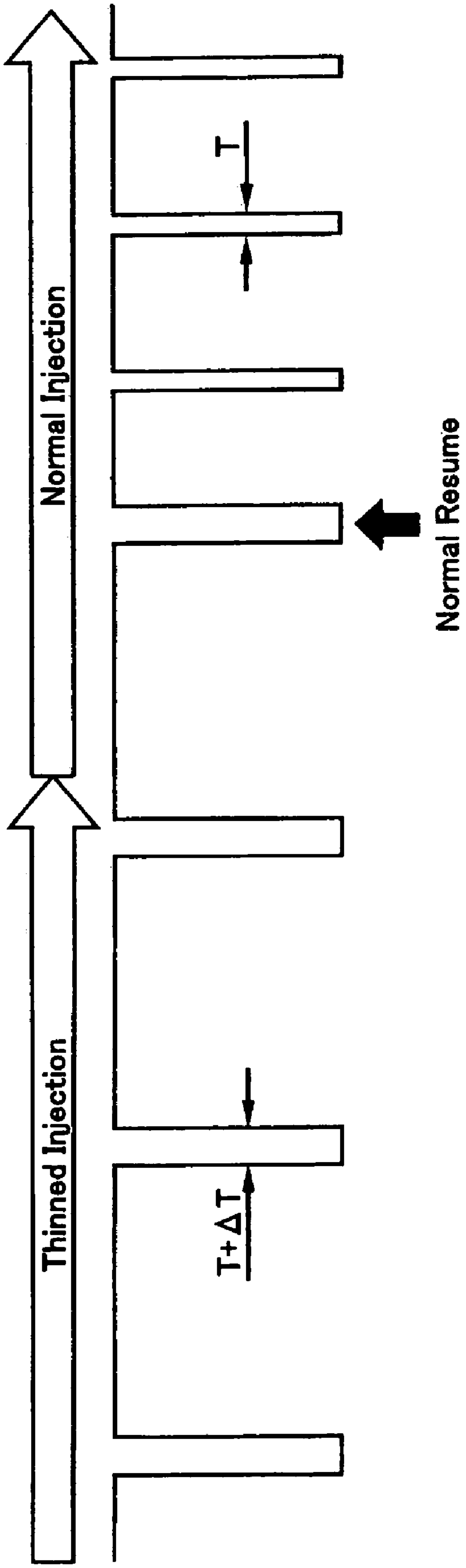
FIG. 20 is a chart showing the fuel-injection time at the time of a normal resume shown in FIG. 18, as the injector voltage command value.

Upon resuming normal fuel-injection, the corrected amount of fuel-injection and the corrected ignition timing as described above are also resumed to the original condition in the normal fuel-injection. For example, for the fuel-injection amount where the immediate resume takes place, the injection command value is immediately resumed from T+ΔT to T as shown in FIG. 19, by a completely reversed operation with respect to the transition from the normal fuel-injection to the thinned fuel-injection as explained in FIG. 10. On the other hand, where the normal resume takes place, as shown in FIG. 20, even after transition to normal fuel-injection, the first fuel-injection amount is maintained to that of the fuel-injection amount of the thinned fuel-injection immediately before that.

Figure 21:
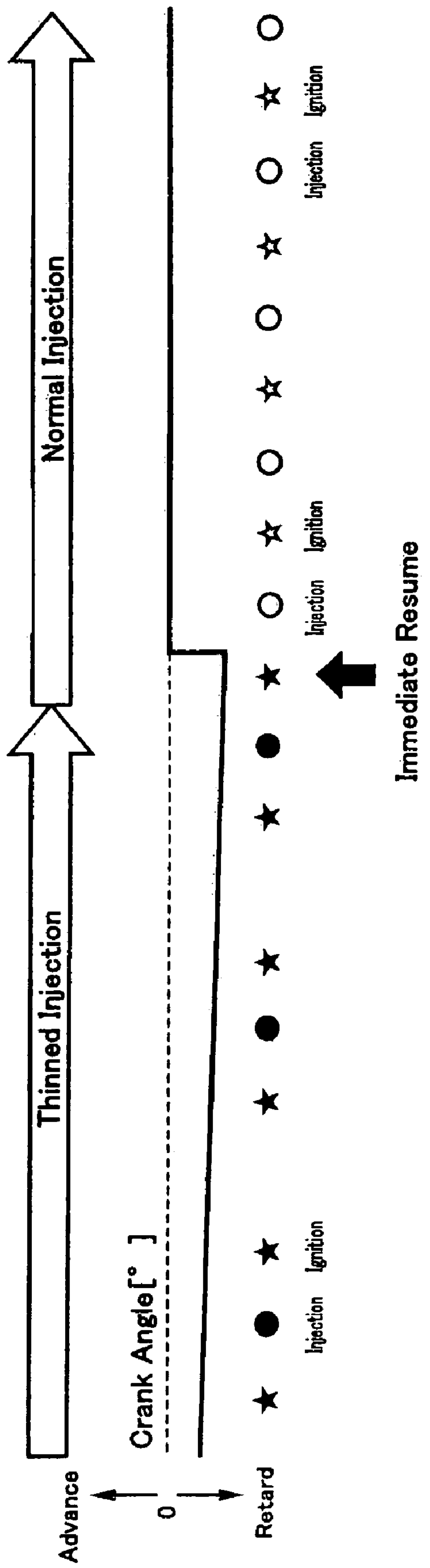
FIG. 21 is a chart showing the ignition timing at the time of the immediate resume shown in FIG. 17, as the crank angle.

Also for the ignition timing upon the immediate resume, as shown in FIG. 21, the same ignition timing for the thinned fuel-injection is used (indicated by "a black star"). This shows, where the fuel is injected with an amount for the thinned fuel-injection (indicated by "a black circle" immediately before the "black star"), even if it has already been shifted to normal fuel-injection, the same ignition timing as that of the thinned fuel-injection is used (by a completely reversed operation with respect to that of the thinned fuel-injection explained in FIG. 13).

For example, since the ignition timing is gradually retarded in this embodiment in order to suppress the torque corresponding to the engine speed or the negative pressure in the air-intake pipe that decrease as the vehicle decelerates during the thinned fuel-injection as shown in FIG. 13, if the time period of the thinned fuel-injection is sufficiently long, the ignition timing is corrected to the retard side as shown in FIG. 21. The transition to the normal fuel-injection is carried out by resuming the correction of the ignition timing to zero degrees.

Figure 22:
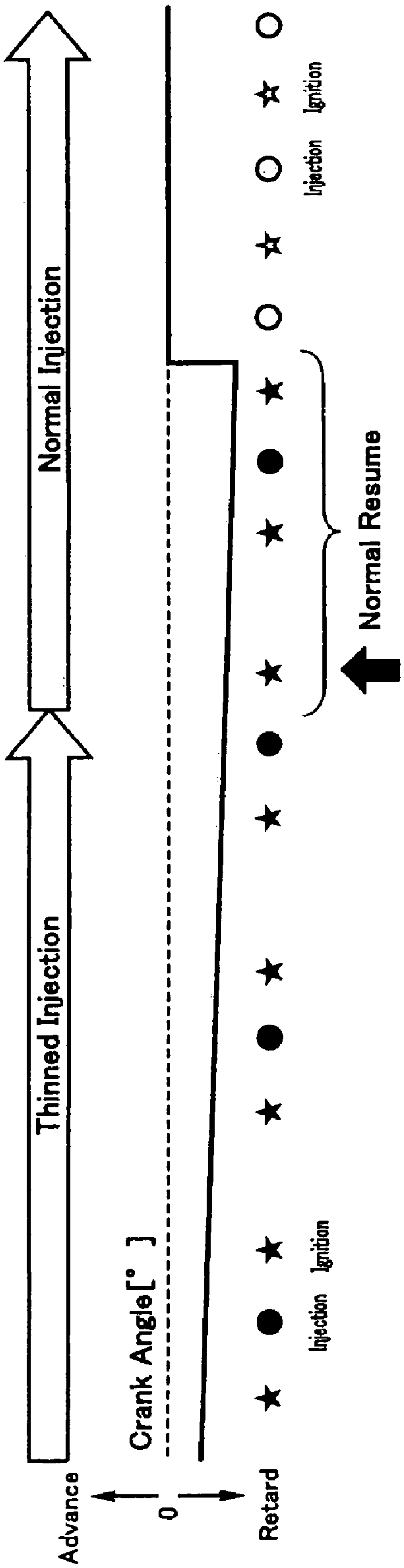
FIG. 22 is a chart showing the ignition timing at the time of the normal resume shown in FIG. 18, as the crank angle.

The ignition timing upon normal resume, as shown in FIG. 22, the same ignition timing correction is used as that of the thinned fuel-injection, although the ignition at the time shown by a black arrow has already been shifted to the normal fuel-injection. This is to synchronize the fuel-injection amount and the ignition timing, as explained in FIG. 21.

In the example of FIG. 22, since it is one injection and one pause, after one injection, it becomes zero pauses, that is, it returns to normal fuel-injection. Therefore, after the last one injection (and ignition), the ignition timing is resumed to that of normal fuel-injection and, thus, it transitions to normal fuel-injection.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions and elements, and/or properties may be claimed through amendment of the present claims or through presentation of new claims in this or a related application. Such claims whether broader, narrower, equal, and/or different in scope to the original claims, also are regarded as included within the subject matter of the present disclosure.

What is claimed is:

1. A method of controlling combustion in a fuel-injection, internal-combustion engine with two or more cylinders, the method comprising:

determining a deceleration condition of a vehicle being driven by the engine; and thinning the fuel-injection of the engine when the deceleration condition is determined;

wherein, where the engine includes an even number of cylinders, said thinning the fuel-injection of the engine includes continuously pausing the even number of fuel-injections, and continuously carrying out a predetermined number of fuel-injections, and where the engine includes an odd number of cylinders, said thinning the fuel-injection of the engine includes continuously pausing the odd number of fuel-injections and carrying out a predetermined number of fuel-injections.

2. An apparatus for controlling combustion of a fuel-injection, internal-combustion engine with two or more cylinders, the apparatus comprising:

a deceleration condition determining module for determining deceleration of a vehicle being driven by the engine; and a fuel-injection thinning module for thinning the fuel-injection of the engine when the deceleration is determined by the deceleration condition determining modules;

wherein the fuel-injection thinning module is configured so that where the engine includes an even number of cylinders, the fuel-injection thinning module continuously carries out a predetermined number of fuel-injections after continuously pausing the even number of fuel-injections, and where the engine includes an odd number of cylinders, the fuel-injection thinning module continuously carries out a predetermined number of fuel-injections after continuously pausing the odd number of fuel-injections.

3. The apparatus of claim 2, wherein the engine includes an air-intake device, and the apparatus further comprising:

a throttle-close-operation detecting module for detecting a closing operation of a throttle of the air-intake device; and an air-intake-pipe negative-pressure detecting module for detecting an increase in a negative pressure in the air-intake pipe of the air-intake device;

wherein the deceleration condition determining module is configured so that it determines the vehicle is decelerating, when the throttle-close-operation detecting module detects the throttle-closing operation, and the air-intake-pipe negative-pressure detecting module detects the increase in the negative pressure in the air-intake pipe.

4. The apparatus of claim 2, wherein the predetermined number of the fuel-injection is one.

5. The apparatus of claim 2, wherein the number of continuous fuel-injection pauses is set based on at least any one of an engine speed, a blow-back rate of burned fuel gas, and a negative pressure in an air-intake pipe of the engine.

6. The apparatus of claim 2, further comprising a fuel-injection-amount adjusting module for adjusting a fuel-injection amount during the thinning of fuel-injection by the fuel-injection thinning module based on at least either one of an engine speed and a negative pressure in an air-intake pipe.

7. The apparatus of claim 6, further comprising an ignition-timing adjusting module for adjusting an ignition timing during the thinning of fuel-injection by the fuel-injection thinning module based on at least either one of the engine speed and the negative pressure in the air-intake pipe.

8. The apparatus of claim 7, wherein the ignition-timing adjusting module is configured so that where combustion of the engine is a first combustion after the fuel-injection thinning module starts the thinning of fuel-injection when the fuel-injection amount is not adjusted by the fuel-injection-amount adjusting module, it does not adjust the ignition timing for the combustion.

9. The apparatus of claim 2, wherein the fuel-injection thinning module is configured so that it carries out the thinning of fuel-injection when the deceleration condition determining module determines that the vehicle is decelerating, and when a water temperature of the engine is not below a predetermined temperature, and a transmission device of the vehicle is not shifted in the neutral position, a clutch of a driving force transmitting path of the vehicle is not disconnected, an engine speed is not below a predetermined speed, and the clutch is not in a state immediately after having been connected.

10. The apparatus of claim 9, wherein the fuel-injection thinning module is configured to terminate the thinning of fuel-injection via a predetermined procedure when the deceleration condition determining module does not determine that the vehicle is decelerating, or the water temperature of the engine is below the predetermined temperature, the transmission device is shifted in the neutral position, the clutch is disconnected, the engine speed is below the predetermined speed, or the clutch is in a state immediately after having been connected.

11. The apparatus of claim 10, wherein the fuel-injection thinning module is configured to immediately terminate the thinning of fuel-injection without carrying out the predetermined procedure, when a throttle valve of the engine is rapidly-opened, the clutch is in a state immediately after having been connected, or the transmission device is shifted in the neutral position.

12. The apparatus of claim 10, wherein the number of continuously paused fuel-injections is set based on at least any one of the engine speed, and a blow-back rate of burned fuel gas, and a negative pressure in an air-intake pipe of an air-intake device of the engine; and wherein the predetermined procedure includes a procedure for completing the number of continuously paused fuel-injections by the fuel-injection thinning module before terminating the thinning of fuel-injection when the throttle is not rapidly opened, the clutch is not in a state immediately after having been connected, and the transmission device is not shifted in the neutral position.

13. The apparatus of claim 12, wherein the fuel-injection amount during the thinning of fuel-injection by the fuel-injection thinning module is configured to be adjusted based on at least either one of the engine speed and the negative pressure in the air-intake pipe; and wherein the fuel-injection thinning module is configured so that when the thinning of fuel-injection is terminated, it continues the adjustment of the fuel-injection amount based on at least either one of the engine speed and the negative pressure in the air-intake pipe, until a first fuel-injection into each of the cylinders after the fuel-injection is restarted.

14. The apparatus of claim 12, wherein the ignition timing during the thinning of fuel-injection by the fuel-injection thinning module is configured to be adjusted based on at least one of the engine speed and the negative pressure in the air-intake pipe; and wherein the fuel-injection thinning module is configured so that when the thinning of fuel-injection is terminated, it continues the adjustment of the ignition timing based on at least one of the engine speed and the negative pressure in the air-intake pipe, until a first fuel-injection into each of the cylinders after the fuel-injection is restarted.

15. The apparatus of claim 2, wherein the number of continuously paused fuel-injections is set based on at least any one of the engine speed, and a blow-back rate of burned fuel gas, and a negative pressure in an air-intake pipe of an air-intake device of the engine.

16. The apparatus of claim 15, wherein the fuel-injection thinning module is configured to terminate the thinning of fuel-injection via a predetermined procedure; and wherein the predetermined procedure includes a procedure for completing the number of continuously paused fuel-injections by the fuel-injection thinning module before terminating the thinning of fuel-injection when the throttle is not rapidly opened, the clutch is not in a state immediately after having been connected, and the transmission device is not shifted in the neutral position.

17. The apparatus of claim 2, wherein the fuel-injection thinning module is configured to terminate the thinning of fuel-injection via a predetermined procedure; and wherein the predetermined procedure includes a procedure for completing the number of continuously paused fuel-injections by the fuel-injection thinning module before terminating the thinning of fuel-injection when the throttle is not rapidly opened, the clutch is not in a state immediately after having been connected, and the transmission device is not shifted in the neutral position.

18. A vehicle comprising an apparatus for controlling combustion of a fuel-injection, internal-combustion engine with two or more cylinders, the apparatus including:

a deceleration condition determining module for determining deceleration of a vehicle being driven by the engine; and a fuel-injection thinning module for thinning the fuel-injection of the engine when the deceleration condition is determined by the deceleration condition determining module, wherein the fuel-injection thinning module is configured so that where the engine includes an even number of cylinders, the fuel-injection thinning module continuously carries out a predetermined number of fuel-injections after continuously pausing the even number of fuel-injections, and where the engine includes an odd number of cylinders, the fuel-injection thinning module continuously carries out a predetermined number of fuel-injections after continuously pausing the odd number of fuel-injections.

* * * * *